United States Patent [19]
Stewart

[11] 3,790,723
[45] Feb. 5, 1974

[54] TEST ARRANGEMENT FOR A TWO-WIRE TELEPHONE CHANNEL

[75] Inventor: Edward F. Stewart, Raleigh, N.C.

[73] Assignee: International Telephone and Telegraph Corporation, Nutley, N.J.

[22] Filed: Oct. 11, 1972

[21] Appl. No.: 296,728

[52] U.S. Cl. ............................................ 179/175.3
[51] Int. Cl. ............................................ H04b 3/46
[58] Field of Search.... 179/175.3, 175.31 R, 18 AF; 340/171 R

[56] References Cited

UNITED STATES PATENTS

| | | | |
|---|---|---|---|
| 3,371,165 | 2/1968 | Earle et al. | 179/175.3 |
| 3,742,155 | 6/1973 | Buck et al. | 179/175.3 |
| 3,636,280 | 1/1972 | Wetzel | 179/175.3 |

*Primary Examiner*—Kathleen H. Claffy
*Assistant Examiner*—Douglas W. Olms
*Attorney, Agent, or Firm*—John T. O'Halloran; Menotti J. Lombardi, Jr.; Alfred C. Hill

[57] ABSTRACT

There is disclosed an arrangement to test the transmission and signaling function of a two-wire carrier telephone channel. The arrangement includes a central office unit to which a test tone is applied for transmission to a subscriber unit. At the subscriber unit a test tone detector detects the test tone and actuates a switching arrangement to connect the tip conductor and ring conductor of a subscriber set together so as to cause a mistermination of a hybrid circuit in the subscriber unit thereby causing the test tone to be looped back to the central office unit where the magnitude of the test tone is measured. From the measurement of the test tone a faulty operation of the channel can be detected. The test tone detector includes a tuned circuit tuned to the frequency of the test tone, a precision halfwave rectifier circuit including a first solid state operational amplifier coupled to the tuned circuit and an output circuit including a second solid state operational amplifier coupled to the output of the rectifier circuit and to the tuned circuit to produce a full wave rectified output signal with voltage gain upon detection of the test tone to actuate the switching arrangement.

6 Claims, 2 Drawing Figures

TEST ARRANGEMENT FOR A TWO-WIRE TELEPHONE CHANNEL

BACKGROUND OF THE INVENTION

This invention relates to a test arrangement for a telephone system and more particularly to a loop around test arrangement for a telephone channel.

SUMMARY OF THE INVENTION

An object of the present invention is to provide a loop around test arrangement to test the transmission and signaling function of a two-wire carrier telephone channel.

Another object of the present invention is to provide an improved toned detector to actuate a switching arrangement to establish the loop around connection in a subscriber unit of a two-wire carrier telephone channel to enable testing the transmission and signaling function of said telephone channel.

A feature of the present invention is the provision of a test arrangement for a two-wire telephone channel comprising: a central office unit including first transmit circuitry, first receiver circuitry, and a first hybrid circuit appropriately connected to the input of the first transmit circuitry and the output of the first receiver circuitry; a subscriber unit including second receiver circuitry having its input coupled to the output of the first transmit circuitry by a first propagation medium, second transmit circuitry having its output coupled to the input of the first receive circuitry by a second propagation medium, a subscriber set having a tip conductor and a ring conductor, and a second hybrid circuit appropriately connected to the output of the second receive circuitry, the input of the second transmit circuitry and the tip and ring conductors; a oscillator to produce a test tone having a given frequency coupled to the first hybrid circuit which causes propagation of the test tone through the first transmit circuitry and the second receive circuitry; a test tone detector coupled to the second receive circuitry to detect the test tone and produce a control signal; a switching arrangement coupled to the detector and the tip and ring conductors, the switching arrangement being responsive to the control signal to interconnect the tip and ring conductors to cause a mismatch in a termination of the second hybrid circuit so that the test tone will be looped from the output of the second receive circuitry through the second hybrid circuit, the second transmit circuitry, the first receive circuitry and the first hybrid circuit; and a device coupled to the first hybrid circuit to measure the magnitude of the test tone at the output of the first receive circuitry to determine whether the telephone channel is functioning properly.

Another feature of the present invention is the provision of a tone detector comprising: an input for a tone having a given frequency; a tuned circuit coupled to the input, the tuned circuit being tuned to the given frequency; a precision halfwave rectifier circuit coupled to the tuned circuit; and an output circuit coupled to the output of the rectifier circuit and to the tuned circuit to produce a full wave rectified output signal with voltage gain upon detection of the tone.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
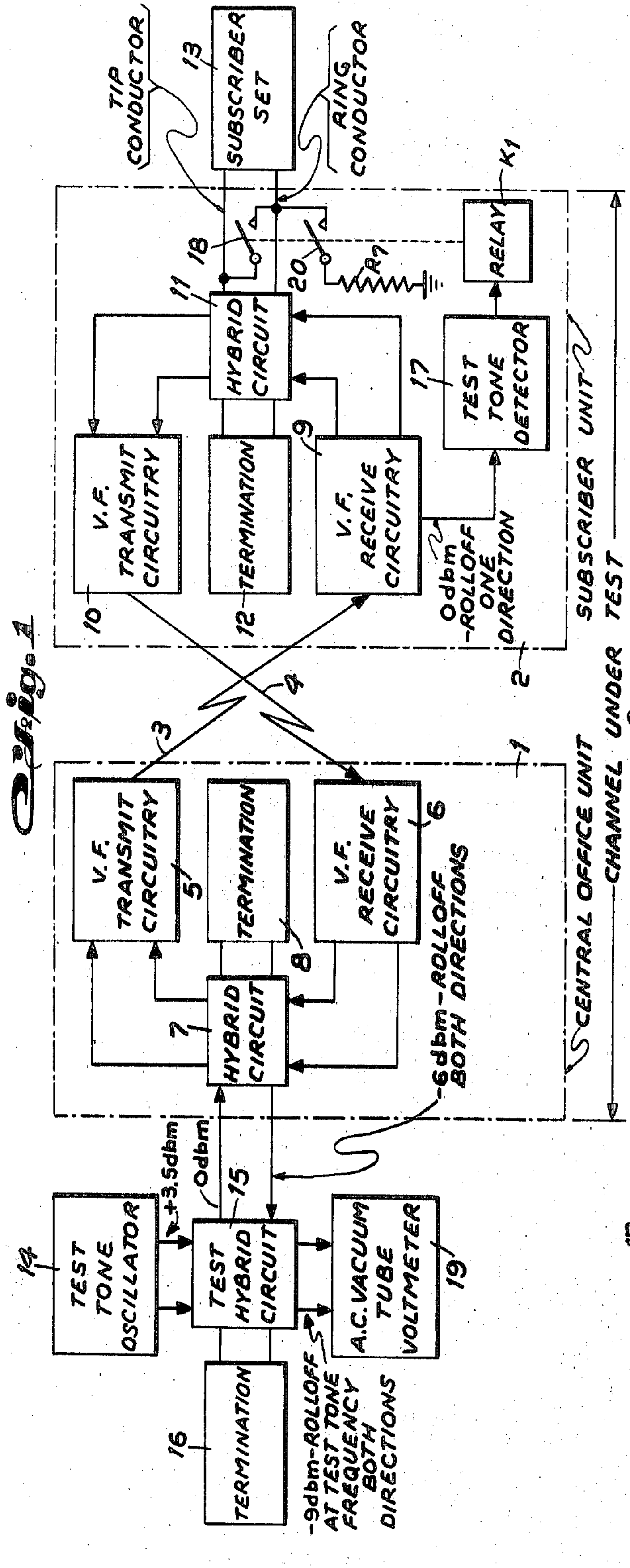
FIG. 1 is a block diagram of the test arrangement in accordance with the principles of the present invention.

Referring to FIG. 1, there is illustrated therein, in block diagram form, a test arrangement of the loop around type in accordance with the principles of the present invention. A carrier telephone channel which is to be tested normally includes a central office unit 1 and a subscriber unit 2 interconnected for bidirectional transmission by video frequency (VF) propagation mediums 3 and 4, such as radio propagation mediums and wire propagation mediums. Unit 1 includes VF transmit circuitry 5 and VF receive circuitry 6 in coupled relationship with the associated propagation mediums 3 and 4 and a hybrid circuit 7 appropriately terminated by termination 8. Hybrid circuit 7 permits a signal from a source to be coupled to transmit circuitry 5 and to pass the output of receive circuitry 6 to a utilization device.

Subscriber unit 2 includes VF receive circuitry 9 coupled to propagation medium 3 and VF transmit circuitry 10 coupled to propagation medium 4. Hybrid circuit 11 properly terminated by termination 12 is coupled to receive circuitry 9 to permit passage of signals at the output thereof over the tip and ring conductors of subscriber set 13 and to couple signals originating from set 13 to the input of transmit circuitry 10.

To carry out the loop around test of the telephone channel a test tone generated by test tone oscillator 14 is coupled to circuitry 5 via test hybrid circuit 15 properly terminated by termination 16 and hybrid circuit 7. The test tone is transmitted on propagation medium 3 to receive circuitry 9 of subscriber unit 2. Test tone detector 17 is coupled to an amplifier of receive circuitry 9 and produces upon detection of the test tone a control signal which actuates relay K1. Upon actuation of relay K1 contact 18 thereof is closed to connect the tip conductor and ring conductor together, in other words, shorts the tip conductor to the ring conductor. This provides a mistermination of hybrid circuit 11 thereby causing the test tone to be passed directly through hybrid circuit 11 to transmit circuitry 10 and eventually to test hybrid circuit 15 via propagation medium 4, receive circuitry 6 and hybrid circuit 7. An AC vacuum tube voltmeter 19 is coupled to hybrid circuit 15 to measure the returned test tone. High and low limits of signal amplitude are established for the particular type of channel involved and if these limits are exceeded there is an indication of a faulty operation of the telephone channel.

Relay K1, when actuated by the control signal at the output of detector 17, also closes contact 20 thereby coupling resistor R7 between both the tip and ring conductors and ground. By connecting resistor R7 between the tip and ring conductor and ground potential there is a resistive ground placed on the subscriber conductors which is required where automatic number identification sensing is provided in the subscriber unit and enables the testing of the operation of this circuit.

Figure 2:
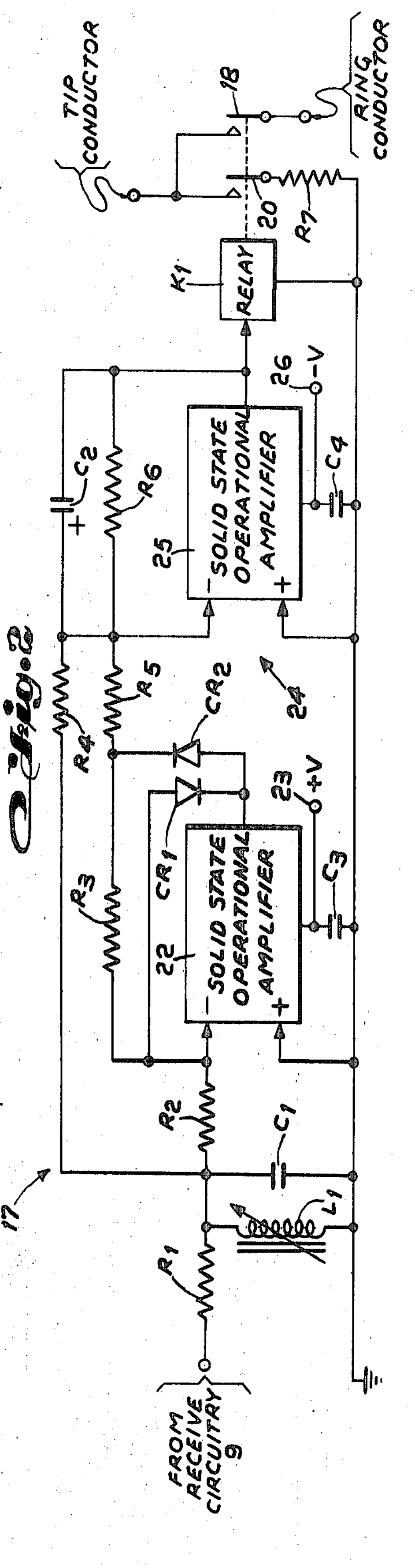
FIG. 2 is a schematic diagram, partially in block form, of the improved test tone detector of the arrangement of FIG. 1.

Referring to FIG. 2, there is illustrated therein, in schematic, partially block diagram, form, the test tone detector 17 of FIG. 1. A parallel tuned circuit including variable inductor L1 and capacitor C1 is connected at one end thereof to ground potential and at the other end thereof to receive circuitry 9 by resistor R1. Resistor R1 provides a bridging resistance for the source of test tone. In a typical example, the test tone has a frequency of three kilohertz and, thus, the parallel tuned circuit including inductor L1 and capacitor C1 would be tuned to this frequency to allow only the test tone frequency to pass to the precision halfwave rectifier 21. Rectifier 21 includes solid state operational amplifier 22 having its non-inverting input ( the + input) connected directly to ground potential and its inverting input ( the – input) coupled by resistor R2 to the junction of resistor R1 and the parallel tuned circuit. Halfwave rectifier 21 further includes solid state diode CR1 poled in the direction illustrated coupled between the output of amplifier 22 and the inverting input thereof. A series circuit including resistor R3 and solid state diode CR2 is also coupled between the output of amplifier 22 and the inverting input therof in a parallel relationship to diode CR1. The diode CR2 is poled in a direction opposite to the direction that diode CR1 is poled.

Amplifier 22 receives its operating potential +V from terminal 23 which is bypassed to ground potential through capacitor C3.

The detector circuit 17 further includes an output circuit 24 including solid state operational amplifier 25 having its non-inverting input directly connected to ground potential. Resistor R5 couples the output of rectifier circuit 21, the junction of resistor R3 and diode CR2, to the inverting input of amplifier 25. Resistor R4 connects the input to amplifier 22, as provided by the parallel tuned circuit, to the inverting input of amplifier 25. The output of amplifier 25 is coupled in a feedback fashion by resistor R6 to the inverting input thereof. A capacitor C2 is connected in parallel with resistor R6. The output circuit 24 sums two times the magnitude of the output signal of halfwave rectifier 21 with the magnitude of the input signal to the halfwave rectifier 21 producing a full wave rectifier output signal with voltage gain at the output of amplifier 25 thereby providing a control or actuating signal for relay K1 when the test tone is detected. The contacts 18 and 20 associated with relay K1 and the resistor R7 associated with contact 20 of relay K1 operate as described hereinabove with respect to FIG. 1. Capacitor C2 operates to filter the full wave output signal from the output of amplifier 25 and provides delay for relay K1.

Amplifier 25 receives its –V operating potential from terminal 26 which is bypassed to ground potential by capacitor C4.

In a reduction to practice the value of the components and the type of components of the detector of FIG. 2 are presented hereinbelow in the following Table.

TABLE

| | |
|---|---|
| $R_1$=5.11 kilohms | C1=0.47 microfarad |
| $R_2$=10 kilohms | C2=10 microfarad, 20 volts |
| $R_3$=10 kilohms | C3=0.01 microfarad |
| $R_4$10 kilohms | C4=0.01 microfarad |
| $R_5$=5 kilohms | L1=variable |
| $R_6$=330 kilohms, ¼ watt, 5% | CR1=1N4152 |
| $R_7$2.7 kilohms, ½ watt, 5% | CR2=1N4152 |
| +V=+12 volts | –V=–12 volts |

While I have described above the principles of my invention in connection with specific apparatus it is to be clearly understood that this description is made only by way of example and not as a limitation to the scope of my invention as set forth in the objects thereof and in the accompanying claims.

I claim:

1. A test arrangement for a two-wire telephone channel comprising:

a central office unit including
first transmit circuitry,
first receive circuitry, and
a first hybrid circuit appropriately connected to the input of said first transmit circuitry and the output of said first receive circuitry;

a subscriber unit including
second receive circuitry having its input coupled to the output of said first transmit circuitry by a first propagation medium,
second transmit circuitry having its output coupled to the input of said first receive circuitry by a second propagation medium,
a subscriber set having a tip conductor and a ring conductor, and
a second hybrid circuit appropriately connected to the output of said second receive circuitry, the input of said second transmit circuitry and said tip and ring conductors;

an oscillator to produce a test tone having a given frequency coupled to said first hybrid circuit which causes propagation of said test tone through said first transmit circuitry and said second receive circuitry;

a test tone detector coupled to said second receive circuitry to detect said test tone and produce a control signal;

a switching arrangement coupled to said detector and said tip and ring conductors, said switching arrangement being responsive to said control signal to interconnect said tip and ring conductors to cause a mismatch in a termination of said second hybrid circuit so that said test tone will be looped from the output of said second receive circuitry through said second hybrid circuit, said second transmit circuitry, said first receive circuitry and said first hybrid circuit; and a device coupled to said first hybrid circuit to measure the magnitude of said test tone at the output of said first receive circuitry to determine whether said telephone channel is functioning properly.

2. An arrangement according to claim 1, further including a first resistor coupled to said switch arrangement to place a resistive ground on said tip and ring conductors when said test tone is detected and said control signal is produced.

3. An arrangement according to claim 1, wherein said detector includes a tuned circuit coupled to said second receive circuitry tuned to said given frequency,
a precision halfwave rectifier circuit coupled to said tuned circuit, and an output circuit coupled to the output of said rectifier circuit and to said tuned circuit to produce a full wave rectified output signal with voltage gain upon detection of said tone.

4. An arrangement according to claim 3, wherein said tuned circuit includes ground potential, a first resistor having one terminal connected to said second receive circuitry, and a parallel coupled inductor-capacitor tuned circuit coupled between the other terminal of said first resistor and said ground potential; and said rectifier circuit includes a first solid state operational amplifier having an inverting input, a non-inverting input and an output, said non-inverting input being directly connected to said ground potential, a second resistor coupled between the junction of said first resistor and said parallel tuned circuit and said inverting input of said first amplifier, a first solid state diode being poled in a given direction connected between said output and said inverting input of said first amplifier, and a series circuit coupled between said output and said inverting input of said first amplifier in parallel with said first diode, said series circuit having a second solid state diode poled in a direction opposite to said given direction, and a third resistor.

5. An arrangement according to claim 4, wherein said output circuit includes a second solid state operational amplifier having an inverting input, a non-inverting input and an output, said non-inverting input being connected directly to said ground potential, a fourth resistor coupled between the junction of said second diode and said third resistor and said inverting input of said second amplifier, a fifth resistor coupled between the junction of said first resistor and said parallel tuned circuit and said inverting input of said second amplifier, a sixth resistor coupled between said output and said inverting input of said second amplifier, and a capacitor coupled in parallel to said sixth resistor, said output of said second amplifier providing said control signal when said test tone is detected.

6. An arrangement according to claim 3, wherein said output circuit includes ground potential, a solid state operational amplifier having an inverting input, a non-inverting input and an output, said non-inverting input being directly connected to said ground potential, a first resistor coupled between the output of said rectifying circuit and said inverting input, a second resistor coupled between said tuned circuit and said inverting input, a third resistor coupled between said output and said inverting input, and a capacitor coupled in parallel to said third resistor, said output providing said control signal when said test tone is detected.

* * * * *